(12) United States Patent
Huang et al.

(10) Patent No.: US 9,898,116 B2
(45) Date of Patent: *Feb. 20, 2018

(54) TOUCH PANEL HAVING MULTIPLE ELECTRODES WITH REDUCED NUMBER OF PINS

(71) Applicant: Wistron Corporation, New Taipei (TW)

(72) Inventors: Tzu-Chieh Huang, New Taipei (TW); Tung-Yang Tang, New Taipei (TW); Hua-Min Tseng, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/145,806

(22) Filed: May 4, 2016

(65) Prior Publication Data

US 2017/0255287 A1   Sep. 7, 2017

(30) Foreign Application Priority Data

Mar. 4, 2016   (TW) .............................. 105106662 A

(51) Int. Cl.
*G06F 3/041*   (2006.01)

(52) U.S. Cl.
CPC .................................... *G06F 3/041* (2013.01)

(58) Field of Classification Search
CPC ........... G06F 3/044; G06F 2203/04111; G06F 2203/04107
See application file for complete search history.

(56) References Cited

U.S. PATENT DOCUMENTS

| | | | |
|---|---|---|---|
| 8,072,429 B2 | 12/2011 | Grivna | |
| 2009/0085891 A1* | 4/2009 | Yang | G06F 3/044 345/174 |
| 2010/0182275 A1* | 7/2010 | Saitou | G06F 3/044 345/174 |
| 2011/0192657 A1 | 8/2011 | Chen | |
| 2013/0120308 A1 | 5/2013 | Wang | |
| 2015/0075959 A1* | 3/2015 | Lu | G06F 3/0416 200/5 R |
| 2015/0253916 A1* | 9/2015 | Chien | G06F 3/0412 345/173 |

FOREIGN PATENT DOCUMENTS

| | | |
|---|---|---|
| CN | 104281306 | 1/2015 |
| TW | 201120716 | 6/2011 |
| TW | I426436 | 2/2014 |

* cited by examiner

*Primary Examiner* — Nelson Rosario
*Assistant Examiner* — Chun-Nan Lin
(74) *Attorney, Agent, or Firm* — JCIPRNET

(57) ABSTRACT

A touch panel including a substrate and a touch element is provided. The substrate has a first predetermined number of touch areas. Each of the touch areas has a second predetermined number of sub touch areas. The touch element includes a plurality of first electrodes, a plurality of second electrodes, a plurality of third electrodes and the first predetermined number of fourth electrodes. Multiple of the first electrodes arranged along a first direction and corresponding to different sub touch areas are electrically connected, multiple of the second electrodes arranged along a second direction and corresponding to different sub touch areas are electrically connected, and multiple of the third electrodes corresponding to different touch areas are electrically connected.

9 Claims, 10 Drawing Sheets

TOUCH PANEL HAVING MULTIPLE ELECTRODES WITH REDUCED NUMBER OF PINS

CROSS-REFERENCE TO RELATED APPLICATION

This application claims the priority benefit of Taiwan application serial no. 105106662, filed on Mar. 4, 2016. The entirety of the above-mentioned patent application is hereby incorporated by reference herein and made a part of this specification.

BACKGROUND

Field of the Invention

The invention is directed to a panel and more particularly, to a touch panel having relatively fewer pins.

Description of Related Art

As the touch control technology matures, touch panels are widely applied in a variety of electronic products, such as mobile phones, tablet computers, notebook computers, and smart wearable devices. In recent years, the touch panels are further applied in large-sized electronic products, such as all in one (AIO) computers, electronic whiteboards, video conferencing systems, and so on.

As the size increases, however, the touch panels require more channels for transmitting signals. For the same reason, the number of pins required for touch detection also increases with the size of the touch panels. The more pins are disposed, the more touch chips need to be used. As a result, not only production costs of the touch panels and the load of hardwares rise, but also the update rate gets reduced. Therefore, how to reduce the number of pins required for the touch detection becomes an issue that needs to be solved by R & D personnels in this field.

SUMMARY

The invention provides a touch panel which contributes to reducing the number of pins required for touch detection.

A touch panel of the invention includes a substrate and a touch element. The substrate has a first predetermined number of touch areas. Each of the touch areas has a second predetermined number of sub touch areas. The touch element is disposed in the first predetermined number of touch areas of the substrate. The touch element includes a plurality of first electrodes, a plurality of second electrodes, a plurality of third electrodes and the predetermined number of fourth electrodes. The first electrodes are arranged along a first direction in the touch areas. Each of the first electrodes includes a plurality of first electrode patterns. The second electrodes are electrically insulated from the first electrodes and arranged along a second direction intersecting the first direction in the touch areas. Each of the second electrodes includes a plurality of second electrode patterns, and orthographic projections of the first electrode patterns and the second electrode patterns on the substrate have a plurality of gaps therebetween. The third electrodes are electrically insulated from the first electrodes and the second electrodes and disposed in the sub touch areas in a one-to-one manner. Each of the third electrodes includes a plurality of third electrode patterns and a plurality of third connection portions. Orthographic projections of the third electrode patterns on the substrate are located in and fill the gaps. Each of the third connection portions electrically insulatingly intersects at least one of the first electrodes or at least one of the second electrodes, and is electrically connected with two adjacent third electrode patterns. Multiple of the first electrodes arranged along the first direction and corresponding to different sub touch areas are electrically connected, and multiple of the second electrodes arranged along the second direction and corresponding to different sub touch areas are electrically connected. The fourth electrodes are electrically insulated from the first electrodes, the second electrodes and the third electrodes. The first predetermined number of fourth electrodes are disposed in the first predetermined number of touch areas in a one-to-one manner. Each fourth electrode overlaps the first electrodes, the second electrodes and the third electrodes in the touch area where the fourth electrode is located, and multiple of the third electrodes corresponding to different touch areas are electrically connected.

In an embodiment of the invention, each of the first electrodes further includes a plurality of first connection portions. Each of the first connection portions is connected with two adjacent first electrode patterns. Each of the second electrodes further includes a plurality of second connection portions. Each of the second connection portions is connected with two adjacent second electrode patterns. The first electrode patterns, the second electrode patterns and the third electrode patterns are distributed on a first layer of the substrate, and the fourth electrodes are distributed on a second layer of the substrate which is different from the first layer.

In an embodiment of the invention, the first electrode patterns, the second electrode patterns and the third electrode patterns respectively have a hexagonal shape, and a part of the third connection portions respectively cross at least one of the first connection portions and at least one of the second connection portions.

In an embodiment of the invention, the second direction is vertical to the first direction.

In an embodiment of the invention, each of a part of the first electrode patterns has a first sub portion and a second sub portion. Orthographic projections of the first sub portion and the second sub portion on the substrate have a first sub gap therebetween. Each of the first electrodes further includes a plurality of first sub connection portions. An orthographic projection of each of the first sub connection portions on the substrate is located in one of the first sub gaps, and each of the first sub connection portions is connected with one of the first sub portions and the corresponding second sub portion. The first sub connection portions in the middle of each of the sub touch areas intersect the third connection portions, and the third electrode patterns connected with the third connection portions respectively extend into and fill one of the first sub gaps.

In an embodiment of the invention, each of the first sub connection portions located between two adjacent sub touch areas crosses two adjacent third electrode patterns in two adjacent sub touch areas.

In an embodiment of the invention, each of a part of the second electrode patterns has a third sub portion and a fourth sub portion. Orthographic projections of the third sub portion and the fourth sub portion on the substrate have a second sub gap therebetween. Each of the second electrodes further includes a plurality of second sub connection portions. An orthographic projection of each of the second sub connection portions on the substrate is located in one of the second sub gaps, and each of the second sub connection portions is connected with one of the third sub portions and the corresponding fourth sub portion. The second sub connection portions in the middle of each of the sub touch areas intersect the third connection portions, and the third electrode patterns connected with the third connection portions respectively extend into and fill one of the second sub gaps.

In an embodiment of the invention, each of the second sub connection portions located between two adjacent sub touch areas crosses two adjacent third electrode patterns in two adjacent sub touch areas.

In an embodiment of the invention, the first predetermined number of touch areas are arranged in a (M×N) array. M and N are respectively positive integers greater than 1, and at least one of M and N is greater than 2. The second predetermined number of sub touch areas are arranged in an (i×j) array. i and j are respectively positive integers greater than 1, and at least one of i and j is greater than 2. Each (M×j) of the first electrodes are electrically connected in parallel. Each (N×j) of the second electrodes are electrically connected in parallel. Each (M×N) of the third electrodes are electrically connected in parallel.

Based on the above, in the touch panel provided by the embodiments of the invention, the third electrodes and the fourth electrodes are additionally disposed in a two-dimensional touch array (including the first electrodes and the second electrodes) architecture. The third electrodes are respectively disposed correspondingly to one of the sub touch areas, and the fourth electrodes are respectively disposed correspondingly to one of the touch areas, thereby facilitating determining correct touched points. Thus, in the embodiments of the invention, multiple of the first electrodes or of the second electrodes corresponding to different sub touch areas can be electrically connected (i.e., share the same pins), and multiple of the third electrodes corresponding to different touch areas are electrically connected, such that the number of pins required for touch detection can be effectively reduced.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
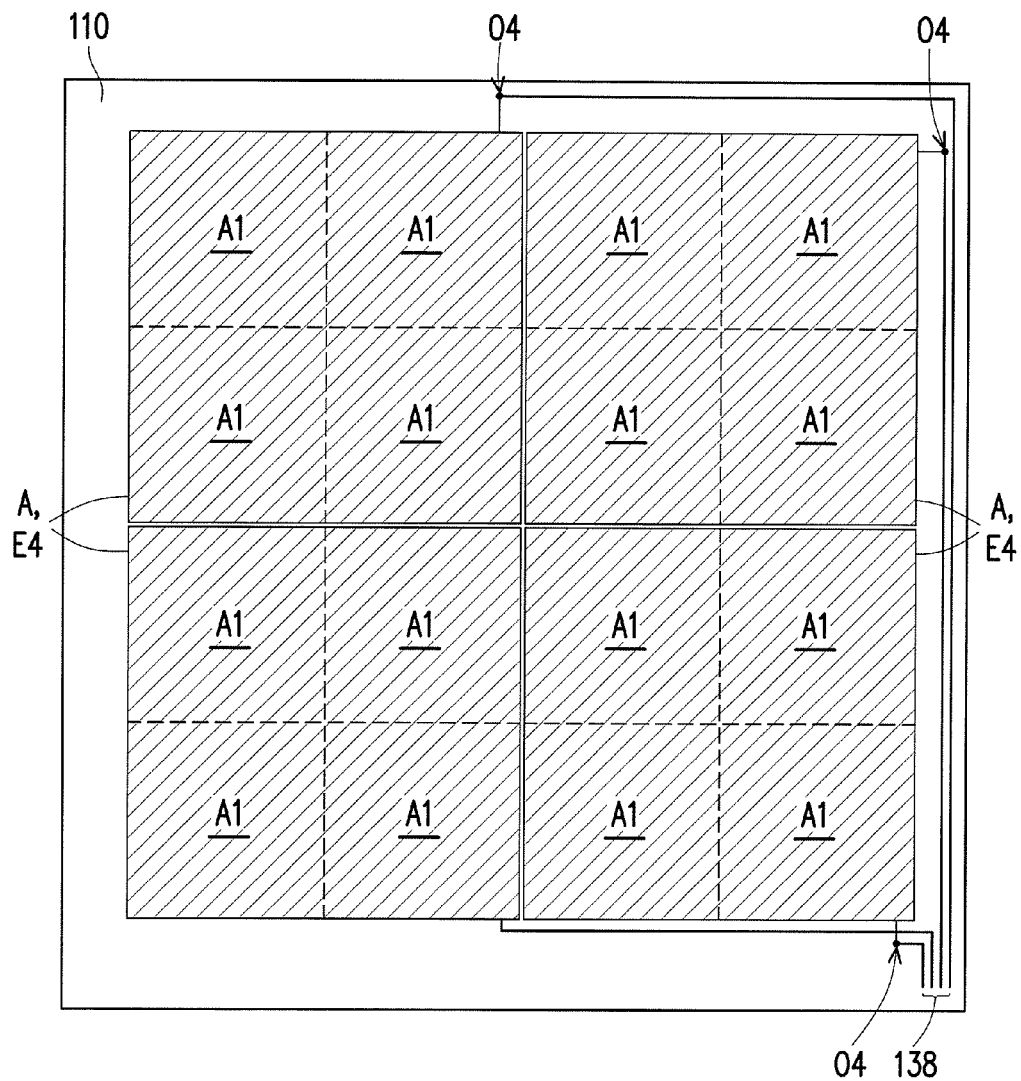
FIG. 1A is a schematic top-view diagram illustrating a touch panel according to a first embodiment of the invention, in which first electrodes, second electrodes, third electrodes, first conductive lines, second conductive lines and third conductive lines are omitted.
Figure 1B:
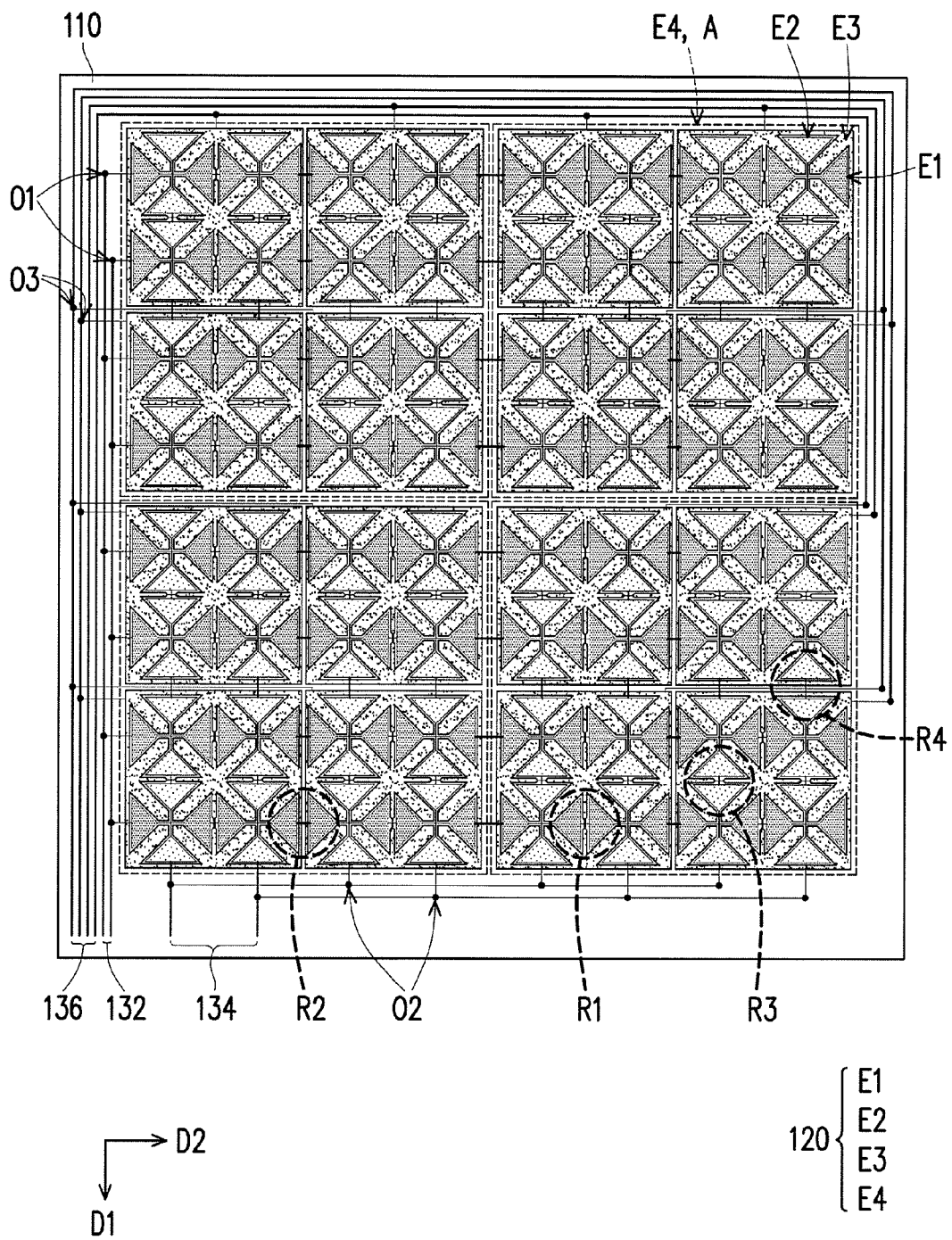
FIG. 1B is a schematic top-view diagram illustrating the touch panel according to the first embodiment of the invention, in which fourth electrodes and fourth conductive lines are omitted.
Figure 1C:
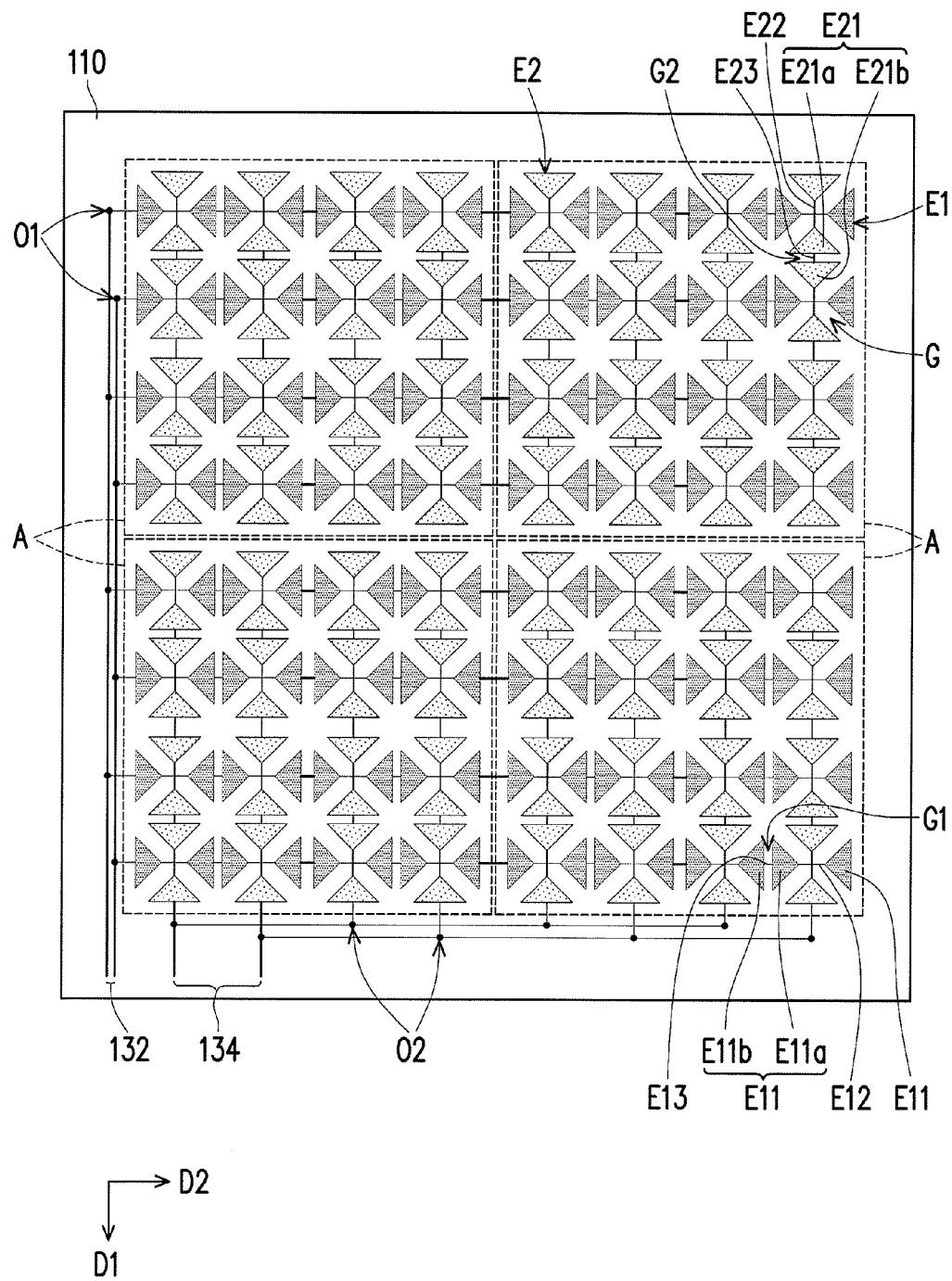
FIG. 1C is a schematic top-view diagram illustrating the touch panel according to the first embodiment of the invention, in which the third electrodes, the fourth electrodes, the third conductive lines and the fourth conductive lines are omitted.
Figure 1D:
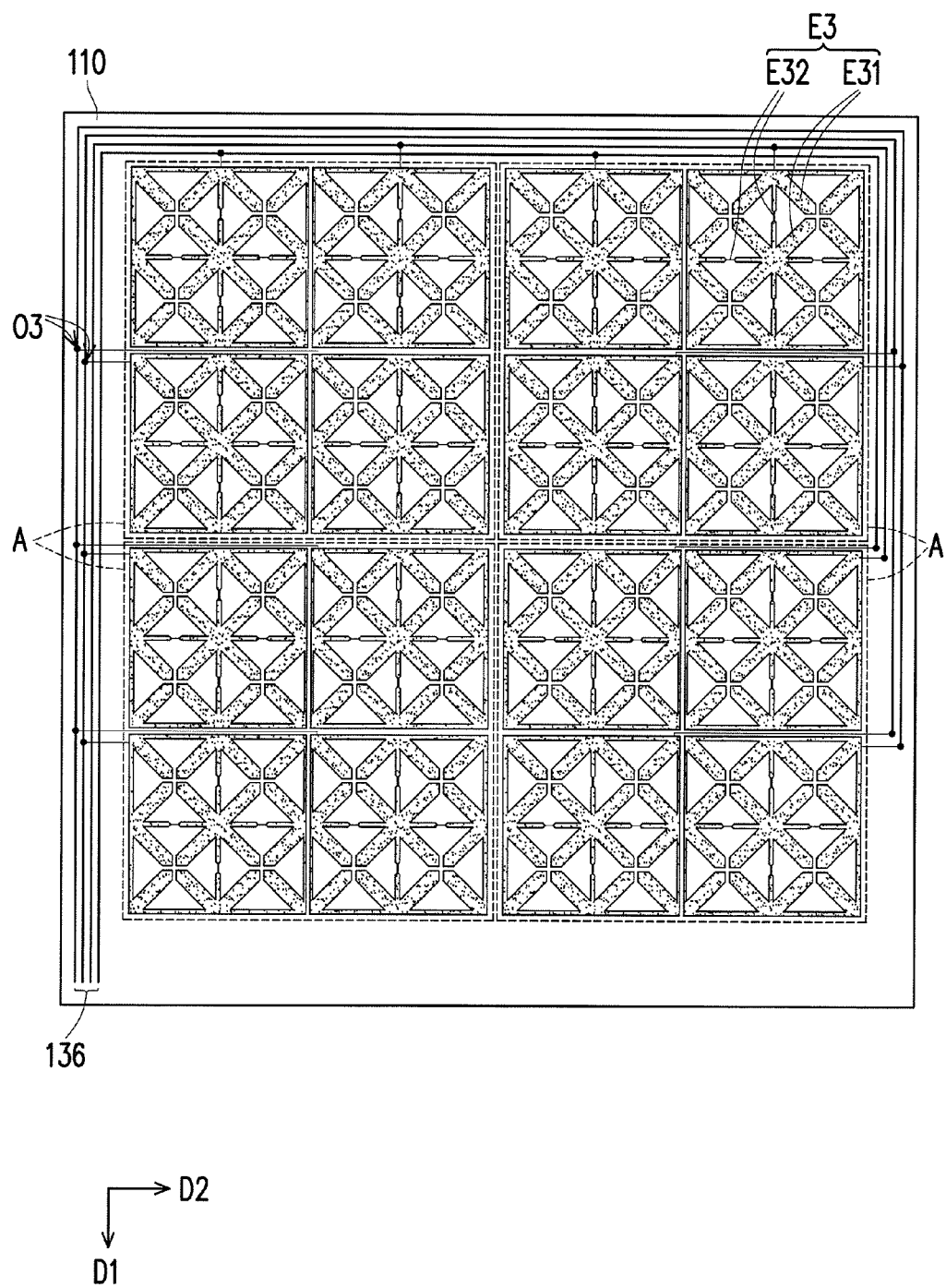
FIG. 1D is a schematic top-view diagram illustrating the touch panel according to the first embodiment of the invention, in which the first electrodes, the second electrodes, the fourth electrodes, the first conductive lines, the second conductive lines and the fourth conductive lines are omitted.

FIG. 1A is a schematic top-view diagram illustrating a touch panel according to a first embodiment of the invention, in which first electrodes, second electrodes, third electrodes, first conductive lines, second conductive lines and third conductive lines are omitted. FIG. 1B is a schematic top-view diagram illustrating the touch panel according to the first embodiment of the invention, in which fourth electrodes and fourth conductive lines are omitted. FIG. 1C is a schematic top-view diagram illustrating the touch panel according to the first embodiment of the invention, in which the third electrodes, the fourth electrodes, the third conductive lines and the fourth conductive lines are omitted. FIG. 1D is a schematic top-view diagram illustrating the touch panel according to the first embodiment of the invention, in which the first electrodes, the second electrodes, the fourth electrodes, the first conductive lines, the second conductive lines and the fourth conductive lines are omitted. FIG. 2A to FIG. 2D are respectively enlarged schematic diagrams of areas R1, R2, R3 and R4 illustrated in FIG. 1B.

Referring to FIG. 1A to FIG. 1D first, a touch panel 100 includes a substrate 110 and a touch element 120. The substrate 110 may be a cover plate or a substrate in a display panel. For example, the substrate 110 may be a glass substrate with high mechanical strength or a flexible plastic substrate, but the invention is not limited thereto. The substrate 110 has a first predetermined number of touch areas A. Each of the touch areas A has a second predetermined number of sub touch areas A1. In the present embodiment, the number of the touch areas A is 4, and the four touch areas A are arranged in a (2×2) array. In addition, the number of the sub touch areas A1 of each touch area A is 4, and the four sub touch areas A1 are arranged in a (2×2) array. However, the numbers and the arrangement manners of the touch areas A and the sub touch areas A1 may vary with demands, which are not limited to those illustrated in FIG. 1A.

The touch element 120 disposed in the first predetermined number of touch areas A of the substrate 110. The touch element 120 includes a plurality of first electrodes E1, a plurality of second electrodes E2, a plurality of third electrodes E3 and the first predetermined number of fourth electrodes E4. In the present embodiment, the number of the first electrodes E1 and the number of the second electrodes E2 are 8, respectively, the number of the third electrodes E3 is 16, and the number of the fourth electrodes E4 is 4. However, the numbers of the first electrodes E1, the second electrodes E2, the third electrodes E3 and the fourth electrodes E4 may vary with demands, which are not limited to those illustrated in FIG. 1A to FIG. 1D. Materials of the first electrodes E1, the second electrodes E2, the third electrodes E3 and the fourth electrodes E4 may include translucent conductive materials. For example, the materials of the first electrodes E1, the second electrodes E2, the third electrodes E3 and the fourth electrodes E4 may be selected from at least one of metal-oxide, Ag nanowire, carbon nano tube and metal mesh, but the invention is not limited thereto.

Referring to FIG. 1C, the first electrodes E1 are arranged along a first direction D1 in the touch areas A, and each of the first electrodes E1 extends along, for example, a second direction D2 which intersects the first direction D1. The second direction D2 is, for example, vertical to the first direction D1, but the invention is not limited thereto. Each of the first electrodes E1 includes a plurality of first electrode patterns E11 and a plurality of first connection portions E12. Each of the first connection portions E12 is connected with two adjacent first electrode patterns E11. In the present embodiment, each of the first connection portions E12 is connected with two adjacent first electrode patterns E11 along the second direction D2.

The second electrodes E2 are electrically insulated from the first electrodes E1 and arranged along the second direction D2 in the touch areas A, and each of the second electrodes E2 extends along, for example, the first direction D1. Each of the second electrodes E2 includes a plurality of second electrode patterns E21 and a plurality of second connection portions E22. Each of the second connection portions E22 is connected with two adjacent second electrode patterns E21. In the present embodiment, each of the second connection portions E22 is connected with two adjacent second electrode patterns E21 along the first direction D1, but the invention is not limited thereto.

Orthographic projections of the first electrode patterns E11 and the second electrode patterns E21 on the substrate 110 do not overlap with each other and have a plurality of gaps G (only one gap G is schematically shown in FIG. 1C) therebetween. Specifically, the first electrode patterns E11 and the second electrode patterns E21 may be distributed on a same layer on the substrate 110. Namely, the first electrode patterns E11 and the second electrode patterns E21 may be formed by a same fabrication process and made of same materials. In this architecture, the first electrode patterns E11 and the second electrode patterns E21 keep a distance (e.g., a width of the gap G) from each other, so as to electrically insulate from each other. Each of the second connection portions E22 intersects one of the first connection portions E12, and an insulation layer (not shown) may be disposed between the second connection portions E22 and the first connection portions E12, such that the second connection portions E22 and the first connection portions E12 may be electrically insulated from each other. The insulation layer may include a plurality of island-shape insulation patterns. Each of the insulation patterns is disposed on one of the first connection portions E12, and each of the second connection portions E22 crosses one of the insulation patterns to connect with two adjacent second electrode patterns E21. In this architecture, the second connection portions E22 and the second electrode patterns E21 are formed by different fabrication processes and may be made of the same or different materials. In another embodiment, the insulation layer may also be a continuous insulation film, and each of the second connection portions E22 may be connected with two adjacent second electrode patterns E21 by openings formed in the insulation film. In yet another embodiment, the first connection portions E12 and the second connection portions E22 may also be stacked in a reverse sequence. In this architecture, each of the first connection portions E12 is connected with two adjacent first electrode patterns E11 by crossing one of the insulation patterns or by openings formed in the insulation film.

The third electrodes E3 are electrically insulated from the first electrodes E1 and the second electrodes E2 and disposed in the sub touch areas A1 in a one-to-one manner. Namely, the sub touch areas A1 have a one-to-one configuration relationship with the third electrodes E3, and the sub touch areas A1 and the third electrodes E3 have the same number. Each of the third electrodes E3 includes a plurality of third electrode patterns E31 and a plurality of third connection portions E32. Orthographic projections of the third electrode patterns E31 on the substrate 110 are located in and fill the gaps G. In the present embodiment, the third electrode patterns E31, the first electrode patterns E11 and the second electrode patterns E21 may be distributed on the same layer on the substrate 110. The third electrode patterns E31 are disposed between the first electrode patterns E11 and the second electrode pattern E21 and keep a distance from the two kinds of electrode patterns, so as to be electrically insulated from the two kinds of electrode patterns. Namely, the third electrode patterns E31 do not contact the first electrode patterns E11 and the second electrode patterns E21. Each of the third connection portions E32 is electrically insulatingly intersects at least one of the first electrodes E1 or at least one of the second electrodes E2, and electrically connected with two adjacent third electrode patterns E31.

Referring to FIG. 1B and FIG. 1C, a part of the first electrode patterns E11 may respectively have a first sub portion E11a and a second sub portion E11b. Orthographic projections of the first sub portion E11a and the second sub portion E11b on the substrate 110 have a first sub gap G1 therebetween. Each of the first electrodes E1 may further include a plurality of first sub connection portions E13. An orthographic projection of each of the first sub connection portions E13 on the substrate 110 is located in one of the first sub gaps G1, and each of the first sub connection portions E13 is connected with one of the first sub portions E11a and the corresponding second sub portion E11b.

Figure 2A:
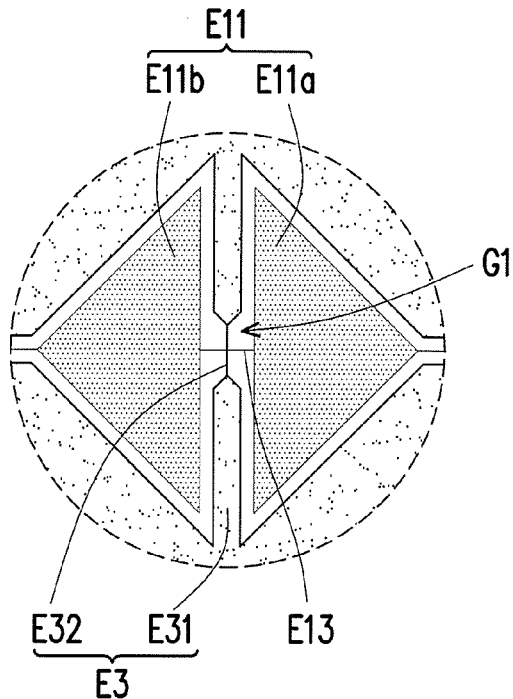
FIG. 2A to FIG. 2D are respectively enlarged schematic diagrams of areas R1, R2, R3 and R4 illustrated in FIG. 1B.

Referring to FIG. 1B and FIG. 2A, the first sub connection portions E13 in the middle of each of the sub touch areas A1 intersect the third connection portions E32, and the third electrode patterns E31 connected with the third connection portions E32 respectively extend into and fill one of the first sub gaps G1. An insulation layer (not shown) may be disposed between the first sub connection portions E13 and the third connection portions E32, such that the first sub connection portions E13 and the third connection portions E32 may be electrically insulated from each other. The third connection portions E32 intersecting the first sub connection portions E13 may be formed after the insulation layer. In this architecture, the third connection portions E32 intersecting the first sub connection portions E13 and the third electrode patterns E31 are formed by different fabrication processes and may be made of the same or different materials, but the invention is not limited thereto.

Figure 2B:
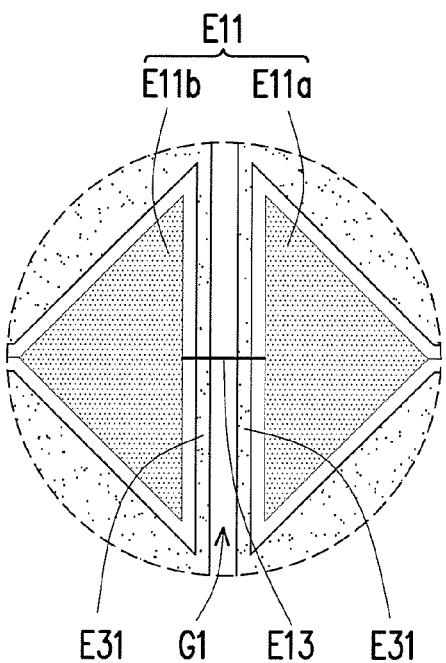

On the other hand, referring to FIG. 1B and FIG. 2B, each of the first sub connection portions E13 located between two adjacent sub touch areas A1 crosses two adjacent third electrode patterns E31 in two adjacent sub touch areas A1. An insulation layer (not shown) may be disposed between the first sub connection portions E13 and the third electrode patterns E31, such that the first sub connection portions E13 and the third electrode patterns E31 may be electrically insulated from each other. The first sub connection portions E13 located between two adjacent sub touch areas A1 may be formed after the insulation layer. In this architecture, the first sub connection portions E13 located between two adjacent sub touch areas A1 and the first sub connection portions E13 in the middle of each of the sub touch areas A1 illustrated in FIG. 2A are formed by different fabrication processes and may be made of the same or different materials.

Referring to FIG. 1B and FIG. 1C, a part of the second electrode patterns E21 may also respectively have a third sub portion E21a and a fourth sub portion E21b. Orthographic projections of the third sub portion E21a and the fourth sub portion E21b on the substrate 110 have a second sub gap G2 therebetween. Each of the second electrodes E2 may further include a plurality of second sub connection portions E23. An orthographic projection of each of the second sub connection portions E23 on the substrate 110 is located in one of the second sub gaps G2, and each of the second sub connection portions E23 is connected with one of the third sub portions E21a and the corresponding fourth sub portion E21b.

Figure 2C:
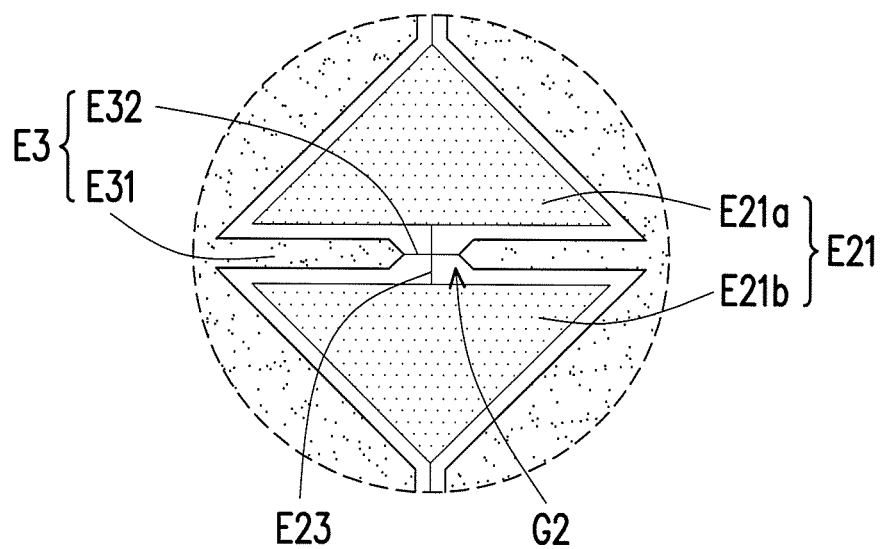

Referring to FIG. 1B and FIG. 2C, the second sub connection portions E23 in the middle of each sub touch area A1 intersect the third connection portions E32, and the third electrode patterns E31 connected with the third connection portions E32 respectively extend into and fill one of the second sub gaps G2. An insulation layer (not shown) may be disposed between the second sub connection portions E23 and the third connection portions E32, such that the second sub connection portions E23 and the third connection portions E32 may be electrically insulated from each other. The second sub connection portions E23 intersecting the third connection portions E32 may be formed after the insulation layer. In this architecture, the third connection portions E32 and the third and fourth sub portions E21a and E21b that are connected to the third connection portions E32 are formed by different fabrication processes and may be made of the same or different materials. In addition, the third connection portions E32 intersecting the second sub connection portions E23 and the third electrode patterns E31 may be distributed on a same layer on the substrate 110. Namely, the third connection portions E32 intersecting the second sub connection portions E23 and the third electrode patterns E31 may be formed by the same fabrication process and made of the same materials. However, the invention is not limited thereto.

Figure 2D:
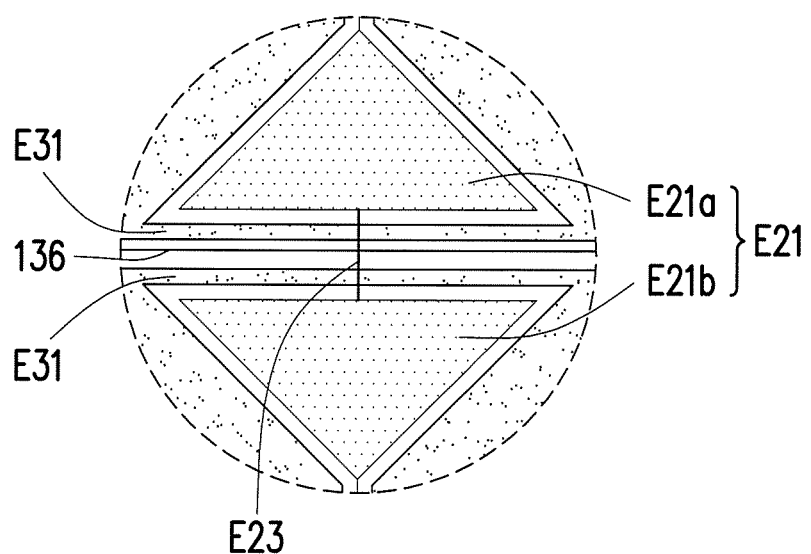

On the other hand, referring to FIG. 1B and FIG. 2D, each of the second sub connection portions E23 located between two adjacent sub touch areas A1 crosses two adjacent third electrode patterns E31 in the two adjacent sub touch areas A1. An insulation layer (not shown) may be disposed between the second sub connection portions E23 and the third electrode patterns E31, such that the second sub connection portions E23 and the third electrode patterns E31 may be electrically insulated from each other. The second sub connection portion E23 located between two adjacent sub touch areas A1 may be formed after the insulation layer. In this architecture, the second sub connection portions E23 located between two adjacent sub touch areas A1 and the second sub connection portions E23 in the middle of each of the sub touch areas A1 illustrated in FIG. 2C may be distributed on the same layer of the substrate 110. Namely, each of the second sub connection portions E23 located between two adjacent sub touch areas A1 and the second sub connection portions E23 in the middle of each sub touch area A1 illustrated in FIG. 2C are formed by the same fabrication process and may be made of the same materials.

Referring to FIG. 1A, the fourth electrodes E4 are electrically insulated from the first electrodes E1, the second electrodes E2 and the third electrodes E3, and the first predetermined number of the fourth electrodes E4 are disposed in the touch areas A in a one-to-one manner. Each fourth electrode E4 overlaps and covers all the first electrodes E1, the second electrodes E2 and the third electrodes E3 in the touch area A where the fourth electrode E4 is located. In the present embodiment, the fourth electrodes E4 and the first electrodes E1, the second electrodes E2 and the third electrodes E3 illustrated in FIG. 1B are formed on a same side surface of the substrate 110, the fourth electrodes E4 are electrically insulated from the first electrodes E1, the second electrodes E2 and the third electrodes E3 by an insulation layer and located on a layer different from the layer where the first electrodes E1, the second electrodes E2 and the third electrodes E3 are located. However, the invention is not limited thereto. For example, the first electrodes E1, the second electrodes E2 and the third electrodes E3 illustrated in FIG. 1B may be formed on the same side surface of the substrate 110, while the fourth electrodes E4 illustrated in 1A may be formed on another side surface opposite to the aforementioned side surface or formed on a thin film substrate which is then bonded to the substrate 110.

Referring to FIG. 1A and FIG. 1B, in the present embodiment, each of the touch areas A is divided into four sub touch areas A1 arranged in a (2×2) array, and each of the sub touch areas A1 is disposed with one of the third electrode E3. Therefore, the fourth electrodes E4 have a one-to-four configuration relationship with the third electrodes E3, but the invention is not limited thereto.

Referring to FIG. 1A to FIG. 1D, multiple of the first electrodes E1 arranged along the first direction D1 and corresponding to different sub touch areas A1 are electrically connected, multiple of the second electrodes E2 arranged along the second direction D2 and corresponding to different sub touch areas A1 are electrically connected, and multiple of the third electrodes E3 corresponding to different touch areas A are electrically connected. In the present embodiment, the touch areas A are arranged in a (2×2) array, and the sub touch areas A1 in each of the touch areas A are arranged in a (2×2) array. The number of the fourth electrodes E4 is 4, and the number of the third electrodes E3 is 16. Each four of the first electrodes E1 are electrically connected in parallel (i.e., eight of the first electrodes E1 require only two pins). Each four of the second electrodes E2 are electrically connected in parallel (i.e., eight of the second electrodes E2 require only two pins). Each four of the third electrodes E3 are electrically connected in parallel (i.e., sixteen of the third electrodes E3 requires only four pins).

Specifically, the touch panel 100 may include a plurality of first conductive lines 132, a plurality of second conductive lines 134, a plurality of third conductive lines 136 and a plurality of fourth conductive lines 138. At least two of the first electrodes E1 are electrically connected in parallel through each of the first conductive lines 132. In the present embodiment, the first conductive lines 132 which are not connected in parallel intersect one another, and the intersecting first conductive lines 132 are electrically insulated from one another by an insulation layer (not shown). A method of electrically connecting the first electrodes E1 includes, for example, forming corresponding first openings O1 in the insulation layer and connecting the corresponding first conductive lines 132 through the first openings O1.

At least two of the second electrodes E2 are electrically connected in parallel through each of the second conductive lines 134. In the present embodiment, the second conductive lines 134 which are not connected in parallel intersect one another, and the intersecting second conductive lines 134 are electrically insulated from one another by an insulation layer (not shown). A method of electrically connecting the second electrodes E2 includes, for example, forming corresponding second openings O2 in the insulation layer and connecting the corresponding second conductive lines 134 through the second openings O2.

At least two of the third electrodes E3 are electrically connected in parallel through each of the third conductive lines 136. In the present embodiment, the third conductive lines 136 which are not connected in parallel intersect one another, and the intersecting third conductive lines 136 are electrically insulated from one another by an insulation layer (not shown). A method of electrically connecting the third electrodes E2 includes, for example, forming corresponding third openings O3 in the insulation layer and connecting the corresponding third conductive lines 136 through the third openings O3.

The fourth conductive lines 138 are respectively connected with the fourth electrodes E4 in a one-to-one manner. In the present embodiment, the fourth conductive lines 138 which are not connected in parallel intersect one another, and the intersecting fourth conductive lines 138 are electrically insulated from one another by an insulation layer (not shown). A method of electrically connecting the fourth electrodes E4 includes, for example, forming corresponding fourth openings O4 in the insulation layer and connecting the corresponding fourth conductive lines 138 through the fourth openings O4.

It should be mentioned that the invention is not intent to limit the fabrication sequence and the electrically connecting manners of the first conductive lines 132, the second conductive lines 134, the third conductive lines 136 and the fourth conductive lines 138. In another embodiment, connection lines may also be disposed on a flexible printed circuit board which is electrically connected with the conductive lines for electrically connecting the electrodes.

By means of the disposition of the fourth electrodes E4, the two-dimensional touch array (including the first electrodes E1 and the second electrodes E2) are divided into a plurality of coordinate reading areas (i.e., the touch areas A), and by means of the disposition of the third electrodes E3, each of the coordinate reading areas (i.e., the touch areas A) are divided into a plurality of sub coordinate reading areas (i.e., the sub touch areas A1). By means of time-divisionally driving the fourth electrodes E4 and the third electrodes E3 in collocation with touched coordinates read by the two-dimensional touch array, the correct touched point may be determined.

Specifically, the fourth electrodes E4 and the third electrodes E3 may serve as driving electrodes, while the first electrodes E1 and the second electrodes E2 may serve as sensing electrodes. In a touch detection operation, a driving signal is sequentially input into the fourth electrodes E4 and the third electrodes E3. For example, the driving signal is sequentially input into four of the fourth electrodes E4 and sequentially input into four sets of the third electrodes E3 (each set of the third electrodes E3 includes four of the third electrodes E3 which are electrically connected). When the touch panel 100 is touched, one of the first conductive lines 132 and one of the second conductive lines 134 output varied voltage signals due to capacitance variations. Due to four of the first electrodes E1 being electrically connected in parallel, and four of the second electrodes E2 being electrically connected in parallel, 16 possible touched points may be obtained by the system in the architecture of FIG. 1B. In this circumstance, the third electrodes E3 and the fourth electrodes E4 driven when the touch operation occurs are compared, such that the correct touched point is selected. However, the driving method of the invention is not limited to the above-described embodiment. In another embodiment, the first electrodes E1 and the second electrodes E2 may serve as driving electrodes, while the third electrodes E3 and the fourth electrodes E4 may serve as sensing electrodes.

In an architecture that the third electrodes E3 and the fourth electrodes E4 are not disposed, all the first electrodes E1 have to be electrically insulated from one another, and all the second electrodes E2 have to be electrically insulated from one another since the correct touched point may not be determined if each two first electrodes E1 (or each two second electrodes E2) are electrically connected in parallel. In other words, in the architecture that the third electrodes E3 and the fourth electrodes E4 are not disposed, eight pins for transmitting driving signals and eight pins for receiving sensing signals are required for the touch element composed of eight first electrodes E1 and eight second electrodes E2. Namely, at least sixteen pins are required.

Comparatively, with the disposition of the third electrodes E3 and the fourth electrodes E4, multiple of the electrodes (e.g., the first electrodes E1 or the second electrodes E2) corresponding to different third electrodes E3 may be electrically connected in parallel (i.e., share the same pins), and multiple of the third electrodes E3 corresponding to different fourth electrodes E4 are electrically connected in parallel, such that the number of pins required for the touch detection operation may be effectively reduced. In the architectures illustrated in FIG. 1A and FIG. 1B, the touch element composed of eight first electrodes E1, eight second electrodes E2, sixteen third electrodes E3 and four fourth electrodes E4 requires two pins for receiving or transmitting the signals of the first electrodes E1, two pins for receiving or transmitting the signals of the second electrodes E2, four pins for receiving or transmitting the signals of the third electrodes E3 and four pins for receiving or transmitting the signals of the fourth electrodes E4. In other words, the number of pins used for the touch detection operation may be effectively reduced from 16 to 12 in the present embodiment. However, the amount of reduction of the pins may vary with different design requirements (e.g., the number of the electrodes and the arrangement of the touch areas), which is not limited to the embodiments illustrated in FIG. 1A and FIG. 1B.

For example, in the architecture that the third electrodes E3 and the fourth electrodes E4 are not disposed, sixteen pins for transmitting driving signals and sixteen pins for receiving sensing signals are required for the touch element composed of sixteen first electrodes E1 and sixteen second electrodes E2. Namely, at least thirty-two pins are required. Comparatively, taking the touch areas A including sixteen first electrodes and sixteen second electrodes E2 and arranged in the (2×2) array, where each of the touch areas A is divided into the sub touch areas A1 arranged in the (2×2) array, for example, sixteen third electrodes E3 and four fourth electrodes E4 are disposed, where each four of the first electrodes E1 are electrically connected in parallel, each four of the second electrodes E2 are electrically connected in parallel, and each four of the third electrodes E3 are electrically connected in parallel. In this architecture, four pins for receiving or transmitting the signals of the first electrodes E1, four pins for receiving or transmitting the signals of the second electrodes E2, four pins for receiving or transmitting the signals of the third electrodes E3, and four pins for receiving or transmitting the signals of the fourth electrodes E4 are required. In other words, the number of pins used for the touch detection operation may be effectively reduced from 32 to 16.

On the other hand, in the architecture that the third electrodes E3 and the fourth electrodes E4 are not disposed, taking a touch element composed of twenty-seven first electrodes E1 and twenty-seven second electrodes E2 for example, twenty-seven pins for transmitting driving signals and twenty-seven pins for receiving sensing signals are required. Namely, at least fifty-four pins are required. Comparatively, taking the touch areas A including twenty-seven first electrodes E1 and twenty-seven second electrodes E2 and arranged in a (3×3) array, where each of the touch areas A is divided into the sub touch areas A1 arranged in a (3×3) array, for example, eight-one third electrodes E3 and nine fourth electrodes E4 are disposed. Each nine of the first electrodes E1 are electrically connected in parallel, each nine of the second electrodes E2 are electrically connected in parallel, and each nine of the third electrodes E3 are electrically connected in parallel. In this architecture, three pins for receiving or transmitting the signals of the first electrodes E1, three pins for receiving or transmitting the signals of the second electrodes E2, nine pins for receiving or transmitting the signals of the third electrodes E3 and nine pins for receiving or transmitting the signals of the fourth electrodes E4 are required. In other words, the number of pins used for the touch detection operation may be effectively reduced from 54 to 24.

Figure 3A:
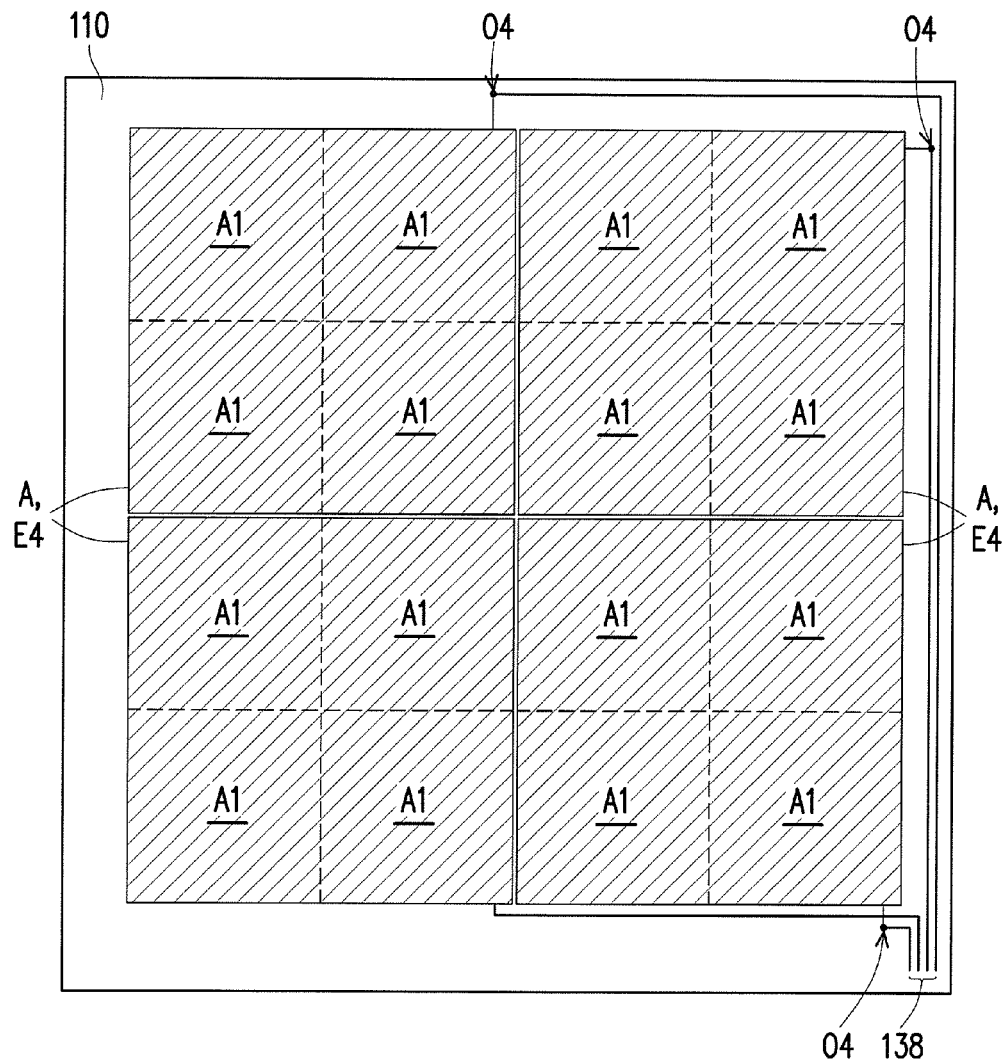
FIG. 3A is a schematic top-view diagram illustrating a touch panel according to a second embodiment of the invention, in which first electrodes, second electrodes, third electrodes, first conductive lines, second conductive lines and third conductive lines are omitted.
Figure 3B:
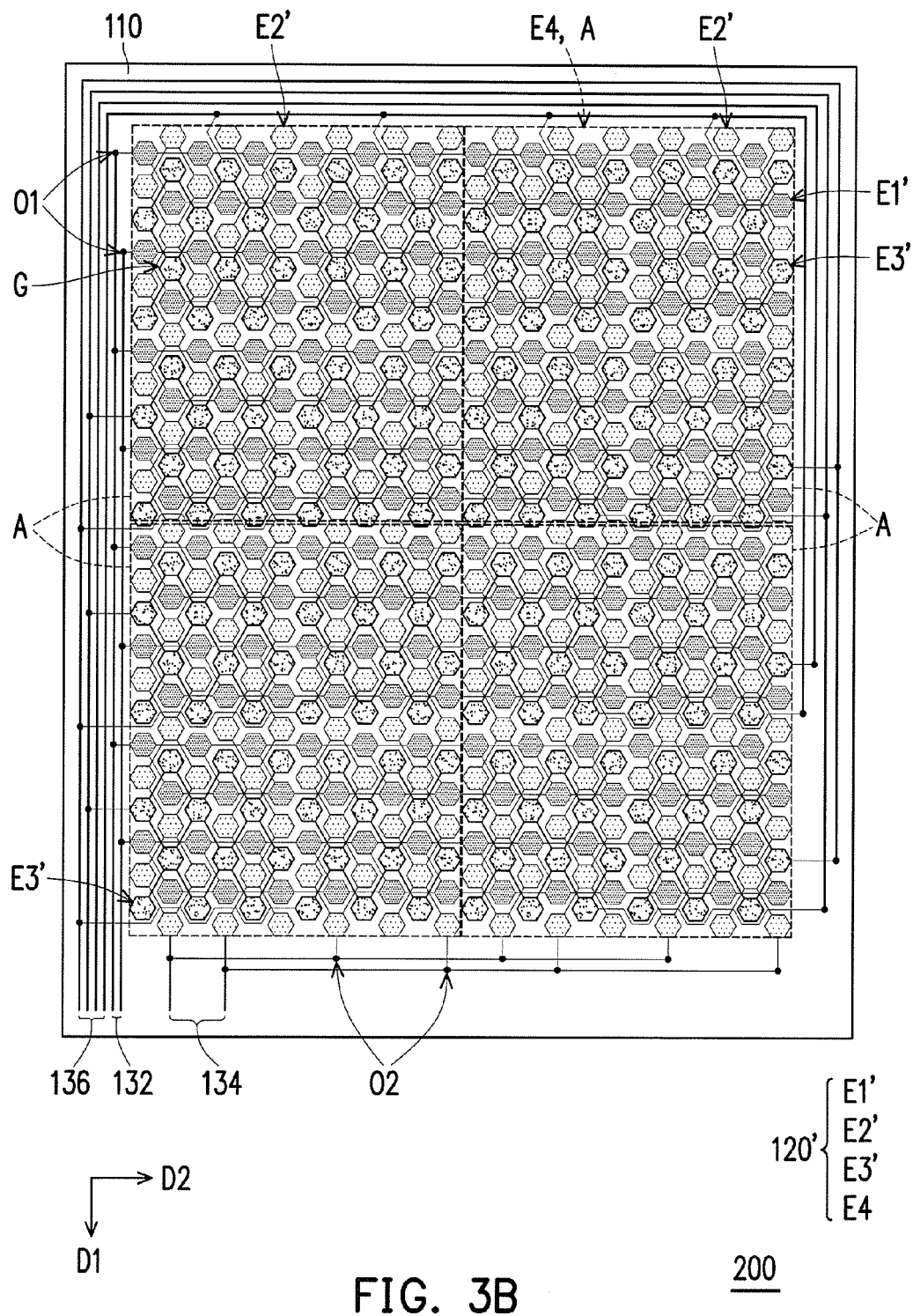
FIG. 3B is a schematic top-view diagram illustrating the touch panel according to the second embodiment of the invention, in which fourth electrodes and fourth conductive lines are omitted.
Figure 3C:
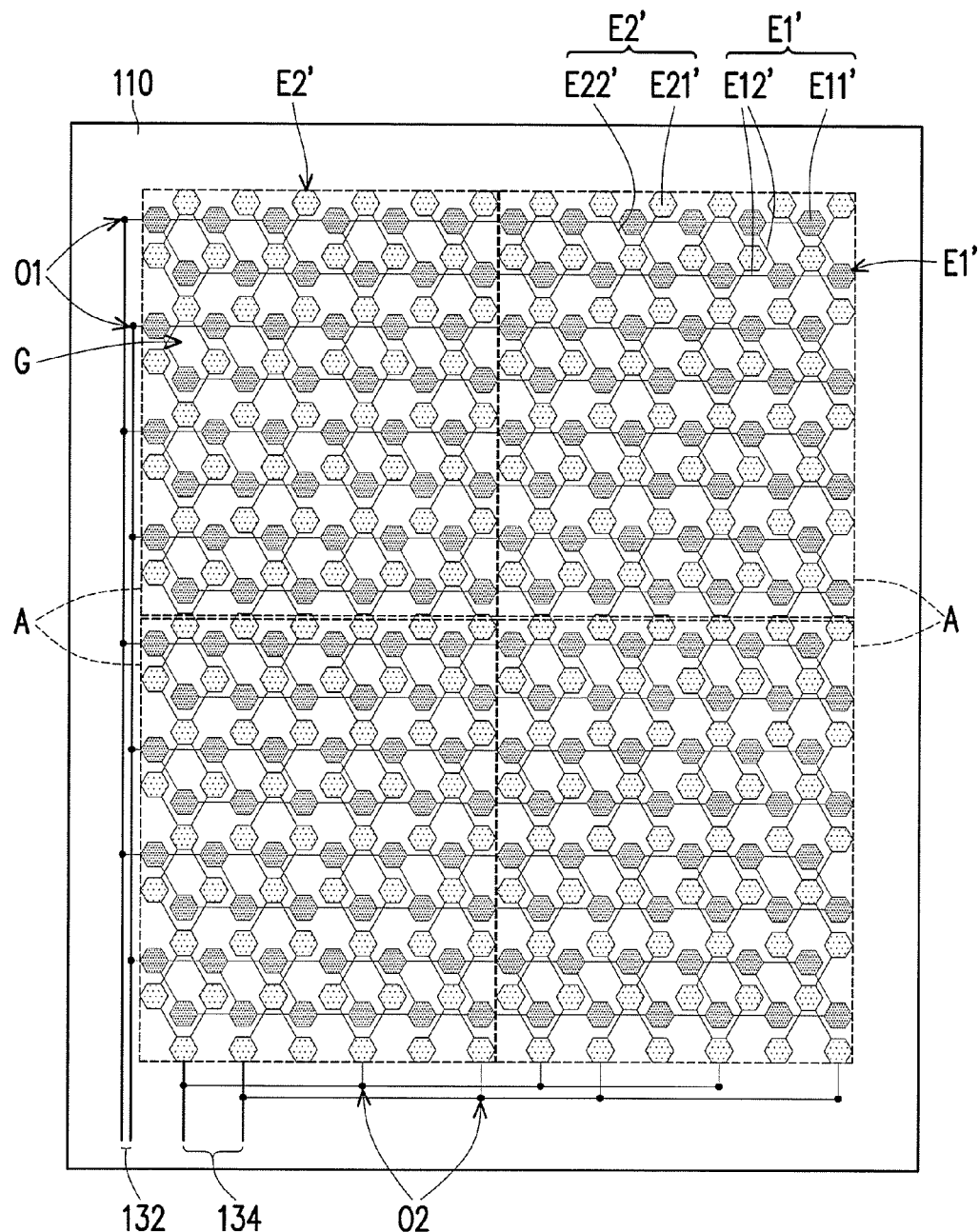
FIG. 3C is a schematic top-view diagram illustrating the touch panel according to the second embodiment of the invention, in which the third electrodes, the fourth electrodes, the third conductive lines and the fourth conductive lines are omitted.
Figure 3D:
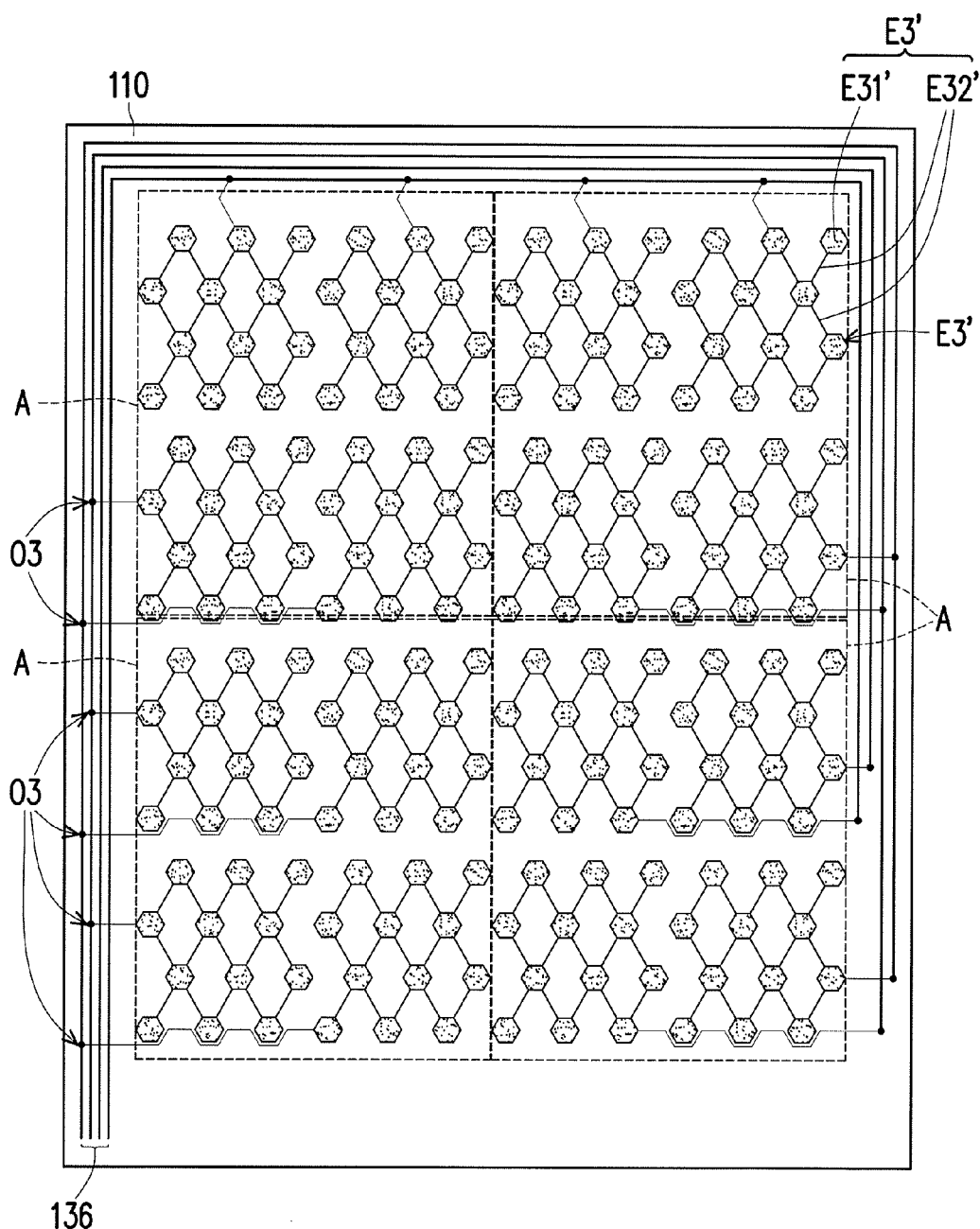
FIG. 3D is a schematic top-view diagram illustrating the touch panel according to the second embodiment of the invention, in which the first electrodes, the second electrodes, the fourth electrodes, the first conductive lines, the second conductive lines and the fourth conductive lines are omitted.

FIG. 3A is a schematic top-view diagram illustrating a touch panel according to a second embodiment of the invention, in which first electrodes, second electrodes, third electrodes, first conductive lines, second conductive lines and third conductive lines are omitted. FIG. 3B is a schematic top-view diagram illustrating the touch panel according to the second embodiment of the invention, in which fourth electrodes and fourth conductive lines are omitted. FIG. 3C is a schematic top-view diagram illustrating the touch panel according to the second embodiment of the invention in which the third electrodes, the fourth electrodes, the third conductive lines and the fourth conductive lines are omitted. FIG. 3D is a schematic top-view diagram illustrating the touch panel according to the second embodiment of the invention, in which the first electrodes, the second electrodes, the fourth electrodes, the first conductive lines, the second conductive lines and the fourth conductive lines are omitted.

Referring to FIG. 3A to FIG. 3D, a touch panel 200 is similar to the touch panel 100 depicted in FIG. 1, where the same components are labeled by the same numerals and thus, will not be repeated. The main difference between the touch panel 200 and the touch panel 200 lies in pattern designs and arrangement manners of first electrodes E1', second electrodes E2' and third electrodes E3' in a touch element 120'.

Specifically, first electrode patterns E11' of each of the first electrodes E1' respectively have a hexagonal shape (but the invention is not limited thereto), and each of at least a part of first connection portions E12' is connected with two adjacent first electrode patterns E11' along a third direction D3. The third direction D3 is neither parallel nor vertical to the first direction D1 or the second direction D2, and an acute angle $\theta 1$ included between the third direction D3 and the second direction D2 is, for example, 60 degrees.

Second electrode patterns E21' of each of the second electrodes E2' respectively have a hexagonal shape (but the invention is not limited thereto), each of at least a part of second connection portions E22' is connected with two adjacent second electrode patterns E21' along the third direction D3 and a fourth direction D4. The fourth direction D4 is neither parallel nor vertical to the first direction D1 or the second direction D2, and an acute angle $\theta 2$ included between the fourth direction D4 and the first direction D1 is, for example, 30 degrees. Each of the second connection portions E22' crosses at least one of the first connection portions E12' to connect with two adjacent second electrode patterns E21'. In this architecture, an insulation layer (not shown) may be disposed between the second connection portions E22' and the first connection portions E12', such that the second connection portions E22' and the first connection portions E12' may be electrically insulated from each other.

Third electrode patterns E31' of each of the third electrodes E3' respectively have a hexagonal shape (but the invention is not limited thereto), each of at least a part of third connection portions E32' is connected with two adjacent third electrode patterns E31' along the third direction D3 and the fourth direction D4. In the present embodiment, the first electrode patterns E11', the second electrode patterns E21' and the third electrode patterns E31' may be distributed on a same layer. A part of the third connection portions E32' respectively cross at least one of the first connection portions E12' and at least one of the second connection portions E22'. In this architecture, an insulation layer (not shown) may be disposed between the third connection portions E32' and the first connection portions E12', and an insulation layer (not shown) may be disposed between the third connection portions E32' and the second connection portions E22'.

Based on the above, in the touch panel provided by the embodiments of the invention, the touch element is divided into a plurality of touch areas. In the two-dimensional touch array (including the first and the second electrodes) architecture, the third electrodes filling the gaps of the two-dimensional touch array and the fourth electrodes respectively corresponding to each of the touch areas and stacked above the first, the second and the third electrodes in the touch areas are additionally disposed, so as to facilitate determining the correct touched point. Thus, in the embodiments of the invention, multiple of the first electrodes or the second electrodes corresponding to different third electrodes can be electrically connected in parallel (i.e., share the same pins), and multiple of the third electrodes corresponding to different fourth electrodes can be electrically connected in parallel, such that the number of pins required for the touch detection operation can be effectively reduced.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:
1. A touch panel, comprising:
   a substrate, having a first predetermined number of touch areas, wherein each of the touch areas has a second predetermined number of sub touch areas; and a touch element, disposed in the first predetermined number of touch areas of the substrate and comprising:
  a plurality of first electrodes, arranged along a first direction in the touch areas, wherein each of the first electrodes comprises a plurality of first electrode patterns;
  a plurality of second electrodes, electrically insulated from the first electrodes and arranged along a second direction intersecting the first direction in the touch areas, wherein each of the second electrodes comprises a plurality of second electrode patterns, and orthographic projections of the first electrode patterns and the second electrode patterns on the substrate have a plurality of gaps therebetween;
  a plurality of third electrodes, electrically insulated from the first electrodes and the second electrodes, wherein the third electrodes are disposed in the sub touch areas in a one-to-one manner, each of the third electrodes comprises a plurality of third electrode patterns and a plurality of third connection portions, orthographic projections of the third electrode patterns on the substrate are located in the gaps, and each of the third connection portions electrically insulatingly intersects at least one of the first electrodes or at least one of the second electrodes and is electrically connected with two adjacent third electrode patterns, wherein multiple of the first electrodes arranged along the first direction and corresponding to different sub touch areas are electrically connected, and multiple of the second electrodes arranged along the second direction and corresponding to different sub touch areas are electrically connected; and
  a first predetermined number of fourth electrodes, electrically insulated from the first electrodes, the second electrodes and the third electrodes, wherein the first predetermined number of fourth electrodes are disposed in the first predetermined number of touch areas in a one-to-one manner, each fourth electrode overlaps the first electrodes, the second electrodes and the third electrodes in the touch area where the fourth electrode is located, and multiple of the third electrodes corresponding to different touch areas are electrically connected.

2. The touch panel according to claim 1, wherein each of the first electrodes further comprises a plurality of first connection portions, each of the first connection portions is connected with two adjacent first electrode patterns, each of the second electrodes further comprises a plurality of second connection portions, each of the second connection portions is connected with two adjacent second electrode patterns, the first electrode patterns, the second electrode patterns and the third electrode patterns are distributed on a first layer of the substrate, and the fourth electrodes are distributed on a second layer of the substrate which is different from the first layer.

3. The touch panel according to claim 2, wherein the first electrode patterns, the second electrode patterns and the third electrode patterns respectively have a hexagonal shape, and a part of the third connection portions respectively cross at least one of the first connection portions and at least one of the second connection portions.

4. The touch panel according to claim 2, wherein the second direction is vertical to the first direction.

5. The touch panel according to claim 2, wherein each of a part of the first electrode patterns has a first sub portion and a second sub portion, orthographic projections of the first sub portion and the second sub portion on the substrate have a first sub gap therebetween, each of the first electrodes further comprises a plurality of first sub connection portions, an orthographic projection of each of the first sub connection portions on the substrate is located in one of the first sub gaps, and each of the first sub connection portions is connected with one of the first sub portions and the corresponding second sub portion, wherein the first sub connection portions in the middle of each of the sub touch areas intersect the third connection portions, and the third electrode patterns connected with the third connection portions respectively extend into and fill one of the first sub gaps.

6. The touch panel according to claim 5, wherein each of the first sub connection portions located between two adjacent sub touch areas crosses two adjacent third electrode patterns in two adjacent sub touch areas.

7. The touch panel according to claim 2, wherein each of a part of the second electrode patterns has a third sub portion and a fourth sub portion, orthographic projections of the third sub portion and the fourth sub portion on the substrate have a second sub gap therebetween, each of the second electrodes further comprises a plurality of second sub connection portions, an orthographic projection of each of the second sub connection portions on the substrate is located in one of the second sub gaps, and each of the second sub connection portions is connected with one of the third sub portions and the corresponding fourth sub portion, wherein the second sub connection portions in the middle of each of the sub touch areas intersect the third connection portions, and the third electrode patterns connected with the third connection portions respectively extend into and fill one of the second sub gaps.

8. The touch panel according to claim 7, wherein each of the second sub connection portions located between two adjacent sub touch areas crosses two adjacent third electrode patterns in two adjacent sub touch areas.

9. The touch panel according to claim 1, wherein the first predetermined number of touch areas are arranged in a (M×N) array, M and N are respectively positive integers greater than 1, at least one of M and N is greater than 2, the second predetermined number of sub touch areas are arranged in a (i×j) array, i and j are respectively positive integers greater than 1, at least one of i and j is greater than 2, each (M×i) of the first electrodes are electrically connected in parallel, each (N×j) of the second electrodes are electrically connected in parallel, and each (M×N) of the third electrodes are electrically connected in parallel.

* * * * *